INVENTOR.
ARTHUR EDWARD DODSON

INVENTOR.
ARTHUR EDWARD DODSON

BY
Rogers, Bereskin, & Parr

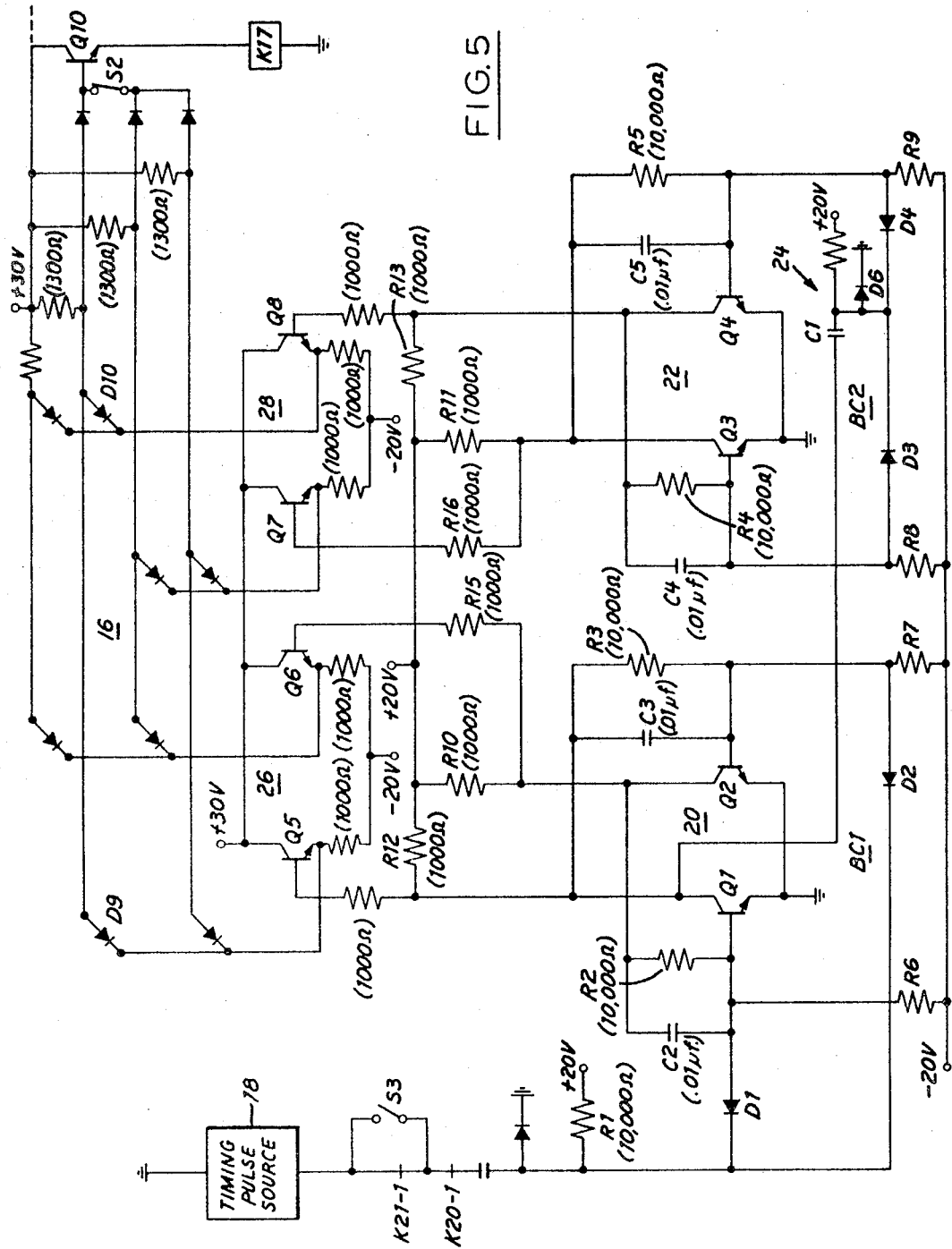

INVENTOR.
ARTHUR EDWARD DODSON

United States Patent Office 3,464,001
Patented Aug. 26, 1969

3,464,001
APPARATUS FOR SEQUENTIALLY TESTING THE CROSSPOINTS OF A FERREED SWITCH FOR CONTACT RESISTANCE
Arthur Edward Dodson, Ottawa, Ontario, Canada, assignor to Northern Electric Company Limited, Montreal, Quebec, Canada
Filed June 27, 1967, Ser. No. 649,347
Int. Cl. G01r 31/02, 27/02, 15/12
U.S. Cl. 324—28                    9 Claims

ABSTRACT OF THE DISCLOSURE

A ferreed switch tester which closes a switch crosspoint, injects current through a contact of such crosspoint to measure its resistance, removes the current, and then opens the crosspoint. These functions are sequenced by a binary counter chain acting through a diode matrix. In one embodiment the counter chain selects for test all the switch crosspoints in sequence. In a further embodiment a high frequency oscillator drives the counter chain rapidly to life test the contacts without measuring their resistance, and a timer periodically connects a low frequency oscillator to the counter chain for slower testing during which contact resistance is measured.

---

This invention relates to testing devices, and more particularly, it relates to devices for performing tests on a ferreed switch of the type used in the telephone industry.

A typical ferreed switch, as used in the telephone industry, may contain some 64 crosspoints, each crosspoint containing several (usually two or four) sealed contacts. Each crosspoint also contains a square loop magnetic material, commonly known as the remandure. Each of the 64 crosspoints is selected or addressed by selecting one $x$ and one $y$ winding each from a group of eight $x$ and eight $y$ windings. By pulsing current through the selected $x$ and $y$ windings, the sealed contacts associated with the addressed crosspoint will be closed and held by the remandure. The crosspoint is opened by pulsing either its $x$ or its $y$ winding alone.

A typical ferreed switch containing 64 crosspoints, each having four sealed contacts, will contain some 256 sealed contacts. After each switch is manufactured, it is often desirable to test the switch to measure the contact resistance, which should not exceed a predetermined minimum. It is sometimes also desirable to test the sealed contacts to ensure that they will open after being closed. At times it is also desirable to be able to perform lifetime tests on a ferreed switch.

Since ferreed switches are produced and used in large numbers, manual testing is a laborious job. A quantity of 100 ferreed switches having 64 four contact crosspoints would contain 25,600 sealed contacts to be tested and evaluated, and it has been found that it takes a person, using a milliohmeter, about ten minutes per contact to select a crosspoint, operate it, measure the contact resistance, record the value and open the crosspoint.

Accordingly, it is an object of the present invention to provide apparatus that will test the sealed contacts of a ferreed switch at a more rapid rate.

In a typical embodiment of the invention, this is achieved by providing a binary counter chain driven from a source of timing pulses. Logic means (typically a diode matrix), connected to the counter chain, provides outputs which operate appropriate means (typically relays) to operate a crosspoint, apply current to a contact of the crosspoint to test the contact, remove the test current, and open the crosspoint in that sequence. Where all the crosspoints of the switch are being tested, the counter chain selects or addresses a new crosspoint for test after test of a previous crosspoint.

Further objects and advantages of the invention will appear from the following disclosure, taken together with the accompanying drawings, in which:

FIG. 5 shows a circuit for two of the binary counters;

Figures 1, 4:
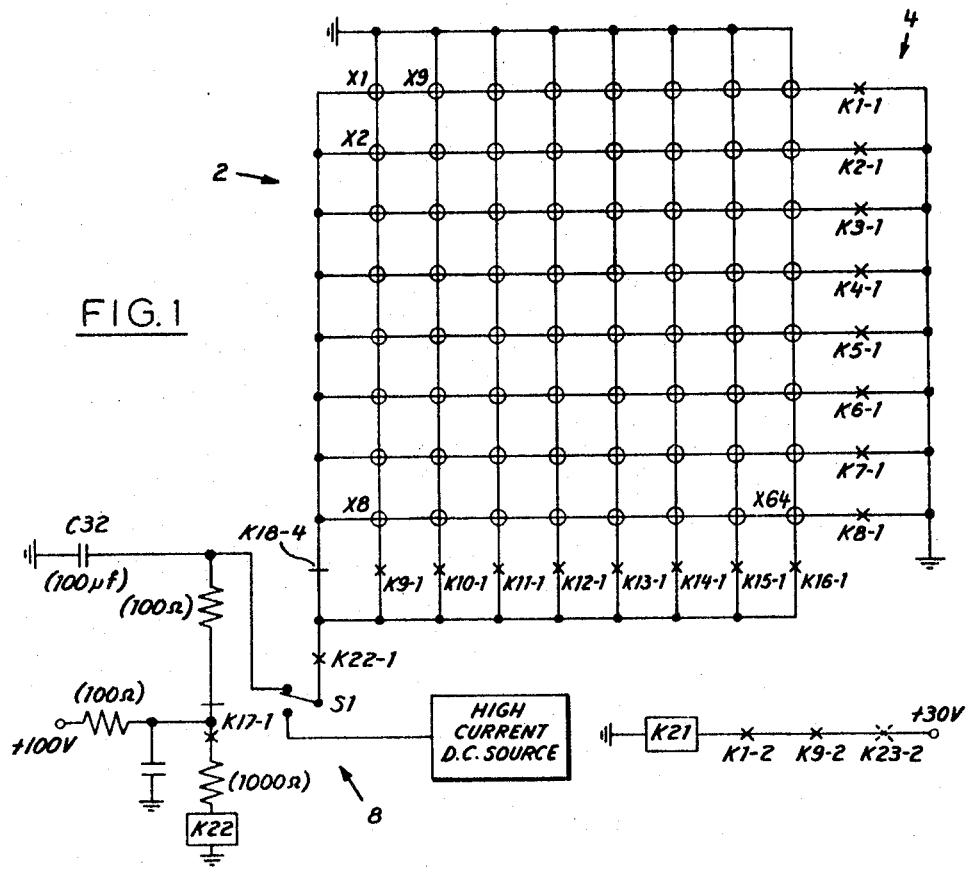
FIG. 1 shows the crosspoint arrangement of a typical 64 crosspoint ferreed switch, together with means for operating and releasing selected individual crosspoints.
FIG. 4 shows the details of the Wheatstone bridge circuit used for measuring contact resistance.

In the drawings, illustrative values of resistors, capacitors and voltage supplies are shown for the specific circuits illustrated.

Reference is first made to FIGURE 1, where there is shown a ferreed switch 2 having 64 crosspoints arranged in an 8 by 8 matrix and numbered from X1 to X64. The crosspoints are controlled by a set of $x$ windings 4 and a set of $y$ windings 6. The $x$ and $y$ windings lead to a power source shown generally at 8, for operating the crosspoints. An individual crosspoint is selected or addressed by operating one of the $x$ address relays K1 to K8 (FIG. 2) to close one of contacts K1-1 to K8-1, and by simultaneously operating one of the $y$ addressing relays K9 to K16 (FIG. 2) to close one of the contacts K9-1 to K16-1. Following the addressing, the power source 8 applies a pulse of current to the selected $x$ and $y$ windings to operate the addressed crosspoint.

Figure 3:
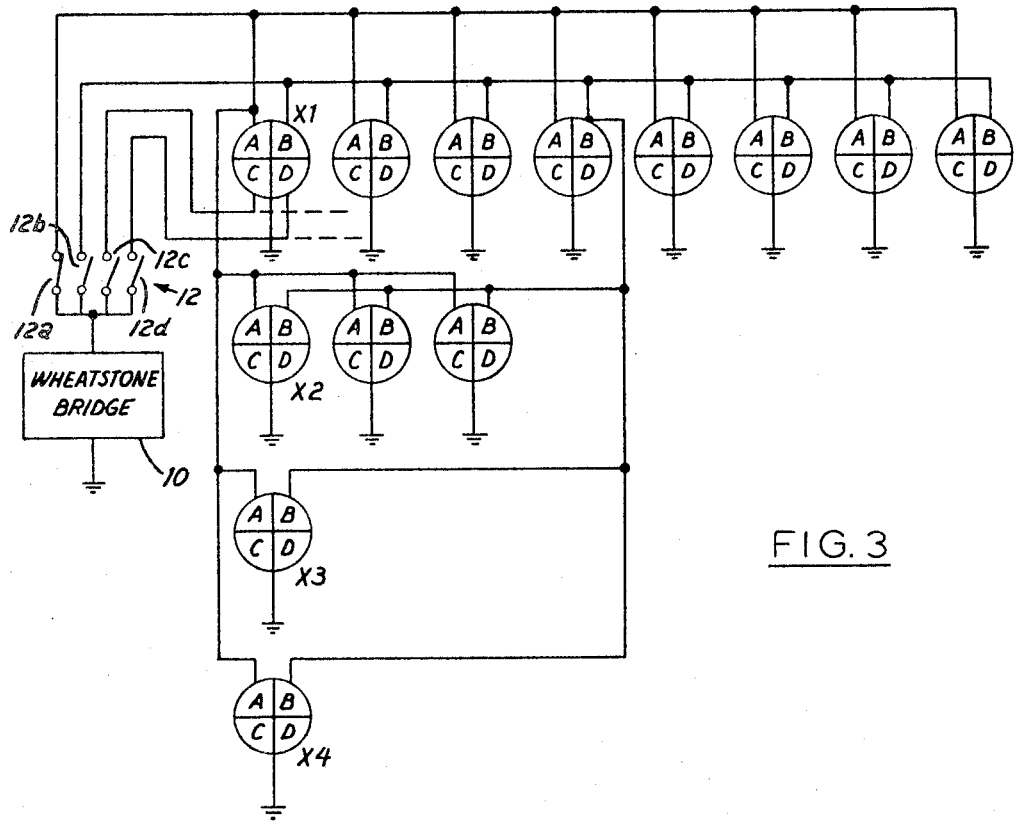
FIG. 3 shows a group selector arrangement for connecting one contact only of the contacts of an addressed crosspoint to a Wheatstone bridge circuit.

After the crosspoint has been closed, one of its four sealed contacts is tested by being placed in a Wheatstone bridge circuit 10, FIG. 3. In FIG. 3, 13 of the 64 crosspoints are shown, each crosspoint being diagrammatically illustrated as including four sealed contacts, A, B, C, D. The selection for test of one of the four contacts of each crosspoint is effected by a group selector switch 12 having four switch sections 12a, 12b, 12c, 12d leading respectively from the Wheatstone bridge to the group A sealed contacts, the group B sealed contacts, etc. All terminals on the other side of the sealed contacts are grounded, as shown diagrammatically.

Thus, when switch section 12a is closed, Wheatstone bridge 10 will be connected to all the group A sealed contacts, so that when crosspoint X1 is closed, its contact A will be placed in a Wheatstone bridge circuit for test. After contact A of crosspoint X1 has been tested and crosspoint X1 released, crosspoint X2 is addressed and closed, and its contact A is tested. After all the group A contacts have been tested, switch section 12a is opened, switch section 12b is closed, and the tests are repeated on the group b sealed contacts.

The details of the Wheatstone bridge circuit 10 are shown in FIG. 4. The bridge includes a pen recorder 19 to record the degree of unbalance of the bridge, this being a measure of the deviation of the contact resistance from a 500 milliohm standard. The operation of the relay contacts shown in the bridge will be explained in detail shortly.

The operations that are performed on each crosspoint and sealed contact in the embodiment being described are as follows.

(a) A crosspoint is addressed and energized and its sealed contacts closed.

(b) Current is applied to the Wheatstone bridge (the contact under test is in the bridge circuit) and the contact resistance is recorded.

(c) Current is removed from the bridge and contact.

(d) The crosspoint is released.

(e) A check is made to see if the contact under test has released. If it has not, the test apparatus will stop, indicating this fact.

It is important that the crosspoint be closed before current is applied to the sealed contact, and that the current be removed from the sealed contact before it is opened, since the contacts in a ferreed switch will burn if they are used to interrupt any significant quantity of current.

Referring again to FIGURE 2, the addressing of the various crosspoints in sequence, and the sequencing of the functions to be performed for each crosspoint, are controlled by a counter chain consisting of 9 binary counters BC1 to BC9 connected in series and operating through diode matrix networks. The counter chain includes two parts, namely, a function counter part (consisting of counters BC1 to BC3), and an address counter part (consisting of counters BC4 to BC9). The addresses the various crosspoints in sequence through a diode matrix 14, selecting a new crosspoint after the testing of a sealed contact of the previous crosspoint is completed. The function counter part, acting in part through a diode matrix 16, controls or sequences the operations performed on each crosspoint and its contact after such crosspoint has been addressed. The binary counter chain is driven from a timing unit 18, which supplies a series of timing pulses.

The circuit for a typical two of the binary counters, namely counters BC1 and BC2, is shown in FIG. 5. Each counter contains a flip-flop (shown at 20, 22 for counters BC1, BC2) coupled to the flip-flop of the previous counter by a trailing edge differentiator 24. Flip-flop 20 is connected to the timing unit 18 through contacts K20–1 and K21–1 of relays K20, K21, the purpose of which will be explained presently. The flip-flops are connected to the diode matrix 16 through emitter-followers 26, 28, to avoid interference with the flip-flops by the load. The values shown for the various components are illustrative.

The operation of counters BC1, BC2 is as follows.

Assume that initially transistors Q1 and Q3 are on and transistors Q2 and Q4 are off. When transistor Q1 is on, its collector is near ground potential, holding the base of transistor Q2 at a potential below ground (through resistors R3, R7) so that transistors Q2 is held off. The collector of transistor Q2 is thus positive and holds the base of transistor Q1 positive (through resistors R2, R6) to hold transistor Q1 on. The same situation exists for transistors Q3 and Q4.

At this time, diode D1 is forward biased, because about +.5 volts is applied to its cathode through diode D5, and a more positive potential is applied to its anode from the base of transistor Q1. Diode D2 is reverse biased because of the negative potential applied to its anode.

When a negative timing pulse is produced by timing unit 18, this forward biases diodes D1 and D2 and turns transistor Q1 off. As transistor Q1 turns off, the potential at its collector rises and a positive going pulse is transmitted through capacitor C3 to the base of transistor Q2 to turn transistor Q2 on. When transistor Q2 turns on, the potential at its collector falls and a negative going pulse is transmitted through capacitor C2 to hold transistor Q1 off.

When transistor Q1 turns off, a positive going pulse is transmitted through capacitor C1 to diodes D3 and D4, but this pulse merely reverse biased these diodes and has no effect on the condition of transistors Q3 and Q4. Now that transistor Q2 is on and transistor Q1 off, diode D2 is forward biased and diode D1 is reverse biased.

When the next negative going pulse is produced by timing unit 18, this turns transistor Q2 off, thus turning transistor Q1 on again. When transistor Q1 turns on, a negative going pulse is transmitted from its collector through capacitor CC1 and through diode D4 to turn transistor Q3 off, thus turning transistor Q4 on.

The result of this arrangement is that each counter of the counter chain is stepped only by every other pulse of the preceding counter in the chain (except of course for the first counter BC1, which is stepped by each pulse of the timing unit).

When transistors Q1 and Q3 conduct, their collectors are near ground potential so that transistors Q5, and Q7 are off. At this time, the collectors of transistors Q2 and Q4 are positive, forward biasing the bases of transistors Q6, Q8 to hold these transistors on.

Because transistor Q5 is off, its emitter is at a relatively negative potential, forward biasing diode D9 for example and maintaining the base of transistor Q10 at a negative potential, keeping transistor Q10 off.

When flip flop 20 steps, turning transistor Q1 off and Q2 on, then transistor Q5 turns on and transistor Q8 remains on. With transistors Q5 and Q8 on, a positive potential is applied to diodes D9 and D10, so that the base of transistor Q10 is no longer negative and this transistor turns on, operating relay K17. In this manner, the counter chain operates in sequence the various control relays of the test apparatus through the diode matrix.

Figure 2:
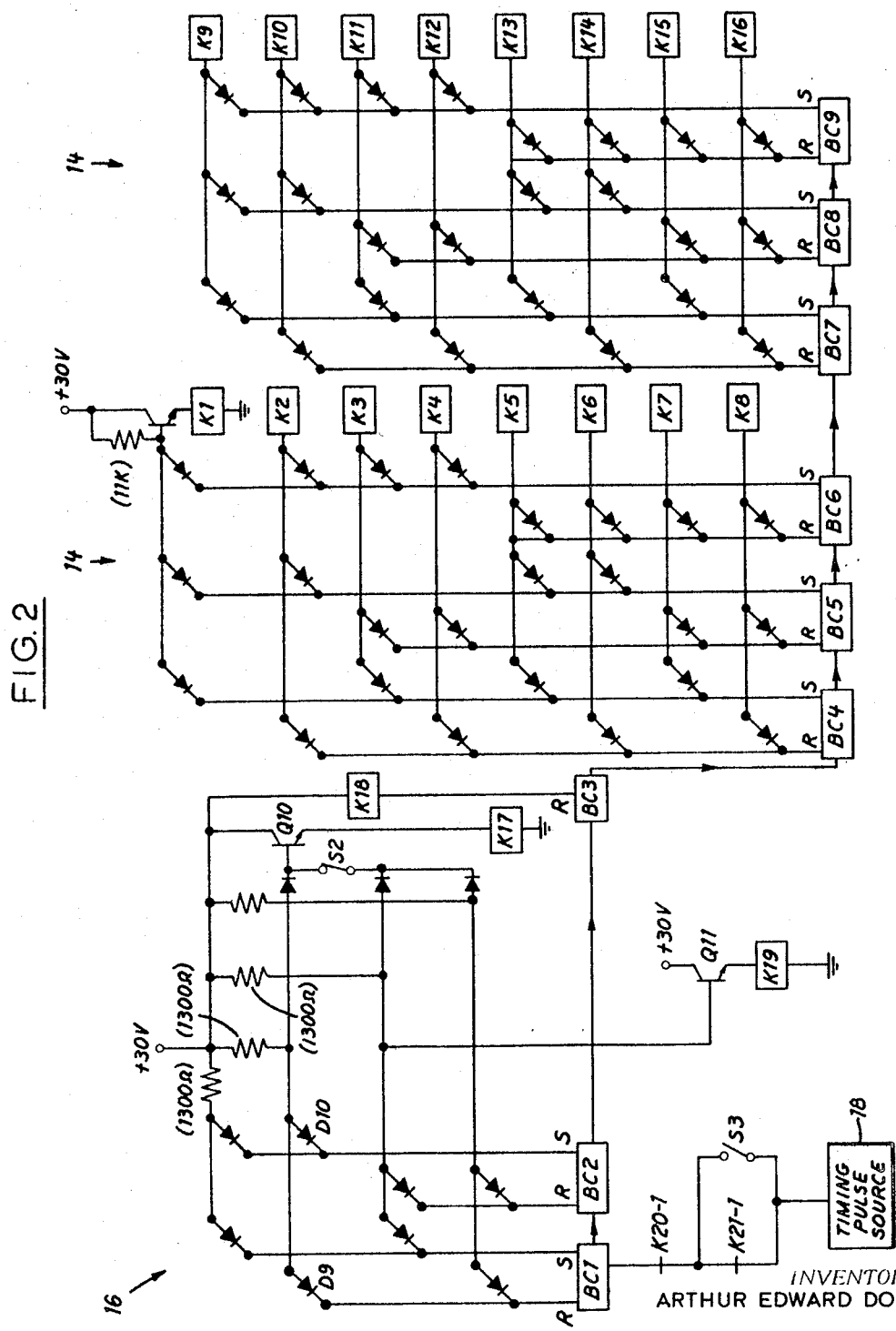
FIG. 2 shows the binary counter chain and diode matrices connecting the counter chain to relays for controlling the test functions performed on each crosspoint, and to relays for addressing individual crosspoints in sequence.

The control relays to control the test functions performed on each addressed crosspoint are relays K17 to K22. Relays K17 to K19, shown in FIG. 2, are operated in a preset sequence by the function counter part of the counter chain, i.e., counters BC1 to BC3. Relay K20, shown in FIG. 4 as part of the Wheatstone bridge circuit, operates when a contact fails to open after test, as will be explained. Relay K21 (FIG. 1) operates after all 64 crosspoints have been checked. Relay K22 (FIG. 1) is controlled by relay K17 to apply power to selected $x$ and $y$ windings, or to a selected $y$ winding alone, at the correct time.

DETAILED OPERATION

The overall operation of the FIGS. 1 to 5 embodiment will now be explained, with reference to Table I below, which shows the condition, either set (S) or reset (R) of the counters BC1 to BC4 during the first nine timing intervals or pulses of the timing unit. It is assumed that all of the counters are set when the apparatus is initially turned on.

TABLE I

| Interval | 1 | 2 | 3 | 4 | 5 | 6 | 7 | 8 | 9 |
|---|---|---|---|---|---|---|---|---|---|
| BC1 | S | R | S | R | S | R | S | R | S |
| BC2 | S |   | R |   | S |   | R |   | S |
| BC3 | S |   |   |   | R |   |   |   | S |
| BC4 | S |   |   |   |   |   |   |   | R |

Interval 1

During this interval, relays K1 and K9 (FIG. 2) operate, since counters BC4 to BC9 are all set. This closes contacts K1–1 and K9–1 to address the first crosspoint X1.

In addition, relays K17, K18, K19 (FIG. 2) are released, because counters BC1 to BC3 are set. With relay K17 released, capacitor C32 (FIG. 1) charges to +100 v. (the value shown is illustrative) through contacts K17–1 released.

Interval 2

During this interval, counter BC1 changes state, turning on transistor Q10 and operating relay K17 (FIG. 2). Relay K22 (FIG. 1) then operates through contacts K17-1 operated to +100 v. and contacts K22-1 connects the charge on capacitor C32 to the $x$ and $y$ windings of the ferreed switch, closing the addressed crosspoint X1. (A 10 ampere, 250 microsecond pulse is usually required either to close or to open a crosspoint.)

Interval 3

During this interval, relay K17 releases, since counters BC1 and BC2 become set and reset respectively. However, crosspoint X1 remains closed due to its remandure. Capacitor C32 recharges in preparation for release of the crosspoint.

In addition, transistor Q11 (FIG. 2) is turned on, operating relay K19.

Contact K19-1 (FIG. 4) then applies +30 v. to the Wheatstone bridge 10, injecting current through the sealed contact X1A of crosspoint X1 under test. The recorder 19 in the bridge is energized at this time and records the contact resistance.

Interval 4

During the fourth interval, transistor Q11 (FIG. 2) is turned off (since counters BC1 and BC2 both become reset), releasing relay K19. Contact K19-1 then removes power from the bridge, removing current from the sealed contact under test (and from the recorder, to reduce noise pickup).

The contact resistance measurement is now completed.

Interval 5

During the fifth interval, counter BC3 for the first time becomes reset and relay K18 (FIG. 2) operates. Relay K18 will remain operated until the end of the eighth interval. When relay K18 operates, its contacts K18-1 and K18-2 open to remove power applied through contact K19-1 to the recorder and the sealed contact under test for the duration of intervals 5 to 8 inclusive. Contact K18-3 closes to prepare a path for operation of relay K20 in the event that the sealed contact under test fails to release.

Finally, contact K18-4 (FIG. 1) opens to prevent application of power to the $x$ windings, in preparation for release of the crosspoint.

Interval 6

During this interval, relay K17 (FIG. 2) operates (since counters BC1, BC2 are reset and set respectively), operating relay K22. The charge on capacitor C32 is then applied through contact K22-1 operated to the addressed $y$ winding to release operated crosspoint X1.

Interval 7

During this interval, relay K19 (FIG. 2) operates, since counters BC1, BC2 are set and reset respectively. Relay K17 releases. If the sealed contact under test has not released, then contact K19-2 (FIG. 4) closed connects grounds through contact K18-3 operated to operate relay K20. Relay K20 locks operated through contact K20-2, and contact K20-1 (FIG. 2) opens to prevent further stepping of the counter chain. The stopping of the test device indicates that the sealed contact last tested has failed to open.

Interval 8

Assuming that the sealed contact under test has opened so that stepping of the counter chain continues, then during this interval, relay K19 releases. No other change occurs.

Interval 9

During this interval, for the first time, counter BC4 is stepped, thus releasing relay K1 and operating relay K2. None of the other counters BC5 to BC9 changes state, so that with relays K2 and K9 operated, crosspoint X2 is addressed. Capacitor C32 charges as before, and the same sequence of events as described for intervals 1 to 8 occurs, but with the group A sealed contact of crosspoint X2 now under test, instead of the group A sealed contact of crosspoint 1. This process is repeated until the group A contacts of all the crosspoints have been checked.

After the group A sealed contacts of all 64 crosspoints have been checked, the cycle recommences with the addressing of crosspoint X1 by operation of relays K1 and K9. At this time, relay K21 is operated, due to operation of contacts K1-2 and K9-2, FIG. 1. Contact K21-1 then interrupts the timing pulses from the timing unit, stopping the testing apparatus. The group selector switch is then moved to select the group B crosspoints and the apparatus is restarted by closing switch S3 for an interval long enough to complete the testing of the group B sealed contact of crosspoint 1.

Figure 6:
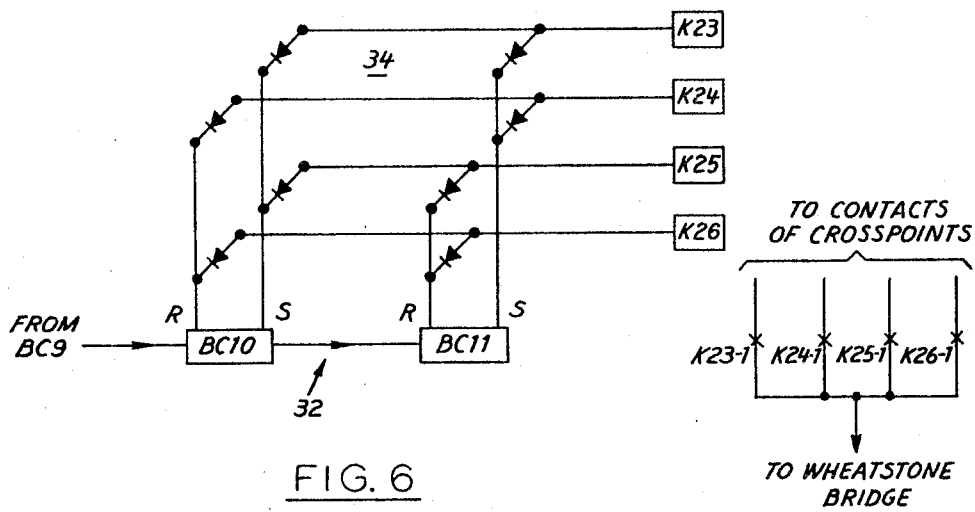
FIG. 6 shows the modification of the FIGS. 1 to 5 embodiment.

If desired, the stepping of the group selector switch can be automated, by adding two extra counters BC10, BC11 (FIG. 6) to the counter chain to form a group selector part 32 of the counter chain. Initially, counters BC10, BC11 will be set, and will operate through diode matrix 34 to operate relay K23. Contact K23-1, which replaces group selector switch section 12a, then closes to connect the Wheatstone bridge to the group A contacts. After all the group A contacts have been tested, counter BC10 is reset (by the setting of counter BC9) to operate relay K24 and release relay K23. Contact K24-1 then connects the group B contacts to the Wheatstone bridge.

After testing of the group D contacts, the cycle commences again with the group A contacts. At this time, relays K1, K9, K23 are operated, and contact K23-2 (shown in dotted lines in FIG. 1) closes to operate relay K21 to stop the machine.

It may be desired, during testing of the crosspoints, to eliminate the effects of the remandure (i.e., to eliminate any chattering of the crosspoint) by applying a steady DC current to the crosspoint to keep it closed, instead of applying a momentary pulse. This can be achieved by closing switch S1, FIG. 1, to connect a high current DC source 40 through contact K22-1 to the $x$ and $y$ windings, instead of connecting capacitor C32 to these windings. In this event, it will be desired to keep relay K22 operated during intervals 3 and 4 as well as interval 2, and therefore switch S2, FIG. 2, is provided and may be closed for this purpose.

In a typical example of use of the apparatus so far described, 49 ferreed switches, the crosspoints of which each contained four sealed contacts, were tested and recorded. The task was easily completed in two eight hour days. A contact having resistance over 500 milliohms was considered defective, and by this standard, of the 12,550 sealed contacts tested, 26 were over 500 milliohms. These 26 contacts were distributed among 21 of the 40 switches tested.

In the apparatus described, the ferreed switch is connected to the test machine by plugging the switch into any suitable frame containing contacts to connect with the various parts of the switch. The wiring connected to the sealed contacts of the switch is used repeatedly, so that if a high resistance develops in such wiring, a high resistance will be recorded at least every eighth operation. This provides a self checking feature for the machine.

Life tester for single crosspoint

Figure 7:
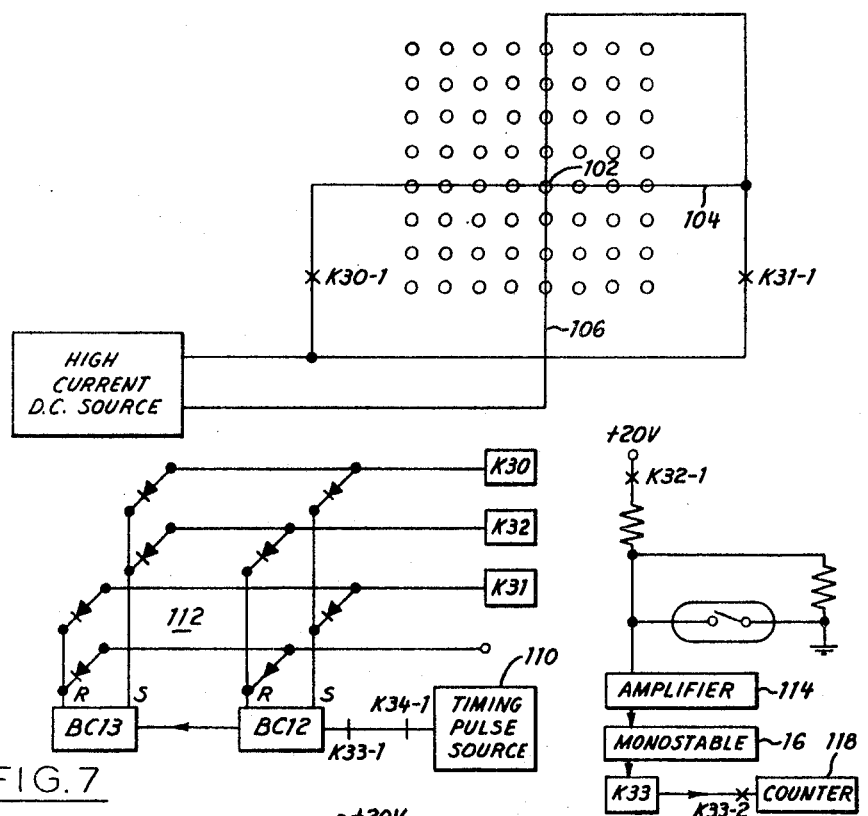
FIG. 7 shows, partly in block diagram form, a second embodiment of the invention, used for performing a life test on the contacts of a single crosspoint.
Figure 8:
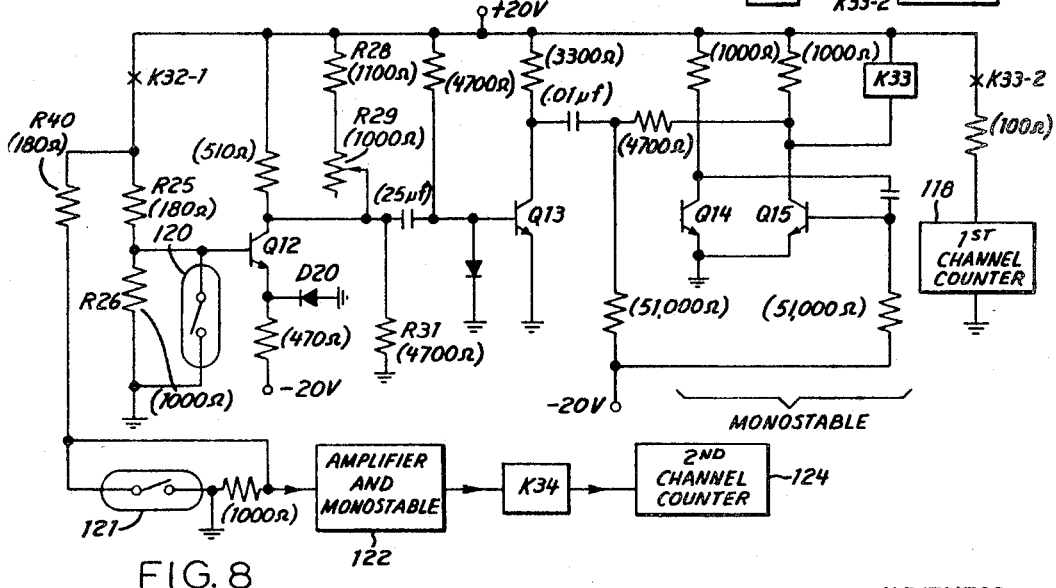
FIG. 8 shows in more detail a circuit for an amplifier and monostable of FIG. 7.

Reference is next made to FIGURES 7 and 8, which illustrate a test machine capable of performing a life test on a single sealed contact in a reasonable length of time. A cycle rate of 25 cycles per second is typical for the to be described, thus allowing one million operations to be carried out in 11.2 hours. During each sealed contact operation, the resistance of the contact is measured, and a counter records the number of times the contact resistance exceeds a 500 milliohm standard. Only two test channels are shown, but as many test channels may be provided as there are sealed contacts in a crosspoint, so that all the contacts in each crosspoint may be checked simultaneously.

Referring firstly to FIGURE 7, a typical crosspoint to be tested is shown at 102. This crosspoint is connected through x and y windings 104, 106 and through contacts K30-1 and K31-1 of relays K30 and K31, to a DC power source 108. The connection is, as shown, such that when relay K30 is operated, power will be applied to both the x and y windings to close the crosspoint, but when relay K31 alone is operated, power will be applied only to the y winding to open the crosspoint.

The operation of relays K30, K31 is sequenced by timing pulses derived from a timing unit 110 (providing 100 pulses per second) driving a counter chain consisting of counters BC12, BC13, the counters being connected through diode matrix 112 to relays K30 and K31. The counters are also connected through the diode matrix to a relay K32 which controls performance of the contact resistance check. The matrix operates relays K30, K32, K31 in that sequence, to close the crosspoint, measure its contact resistance, and open the crosspoint.

The circuit for testing the resistance of the sealed contact is shown in block diagram form in FIGURE 7 and in detail in FIGURE 8. As shown in FIGURE 7, this circuit consists of an amplifier 114 connected to a monostable 116 connected in turn to a relay K33 which operates a counter 118.

In more detail, and with reference to FIGURE 8, when relay K32 is closed, its contact K32-1 applies +20 volts to resistor R25 and the closed sealed contact (indicated at 120) in series. Current is held to 110 milliamperes through the contact 120 by resistor R25.

The resulting output voltage (approximately 25 millivolts) across the sealed contact is proportional to the contact resistance.

The 25 millivolt signal is amplified by transistor Q12, the emitter of which is biased slightly negative by the forward voltage drops of diode D20. The amplified 25 millivolt signal appears at the collector of transistor Q12 as a negative going signal between the voltage limits of +18 volts and +15 volts.

A diode D15 is connected to the collector of transistor Q12. The anode of diode D15 is biased to +15 volts by a resistor network consisting of resistors R28, R29, and R31. This voltage provides the standard voltage against which the contact resistance is compared. This standard may be checked at any time by substituting a one-half ohm resistor in place of the sealed contact, and changes may be made to the standard voltage by adjusting resistor R29.

If the sealed contact resistance increases beyond the 500 milliohm limit, the voltage at the cathode of diode D15 will fall below +15 volts and diode D15 will conduct. The resulting voltage will be passed through capacitor C6 through transistor Q13, where is is amplified and triggers the monostable containing transistors Q14, Q15. In the monostable, transistor Q14 is normally on and transistor Q15 is normally off. When the monostable is triggered, transistor Q15 is turned on, operating relay K33, and contact K33-1 (FIG. 7) disconnects the timing unit 110 from the binary counters, temporarily stopping the testing. Contact K33-2 (FIG. 8) also steps a counter 120, storing the information that the sealed contact resistance increased beyond the allowable limit.

When the monostable recovers (.5 second later with the values shown), contact K33-1 again connects the timing unit to the binary counters and the test functions are resumed.

Resistor R26 is placed across the sealed contact to keep the base circuit of transistor Q12 closed while the sealed contact is open.

To test the second sealed contact 121 of the crosspoint, a second test channel, including resistor R40, an amplifier 122 (in which the second contact is placed), a relay K34, and a second channel counter 124, are provided. Further test channels may be provided if the crosspoint has further sealed contacts.

In a typical test using the apparatus, a crosspoint having two sealed contacts was run for several million operations, and both its contacts were tested. Only one contact of the group of four went high resistance, and this was after approximately 3 million operations.

Life tester for entire switch

Figure 9:
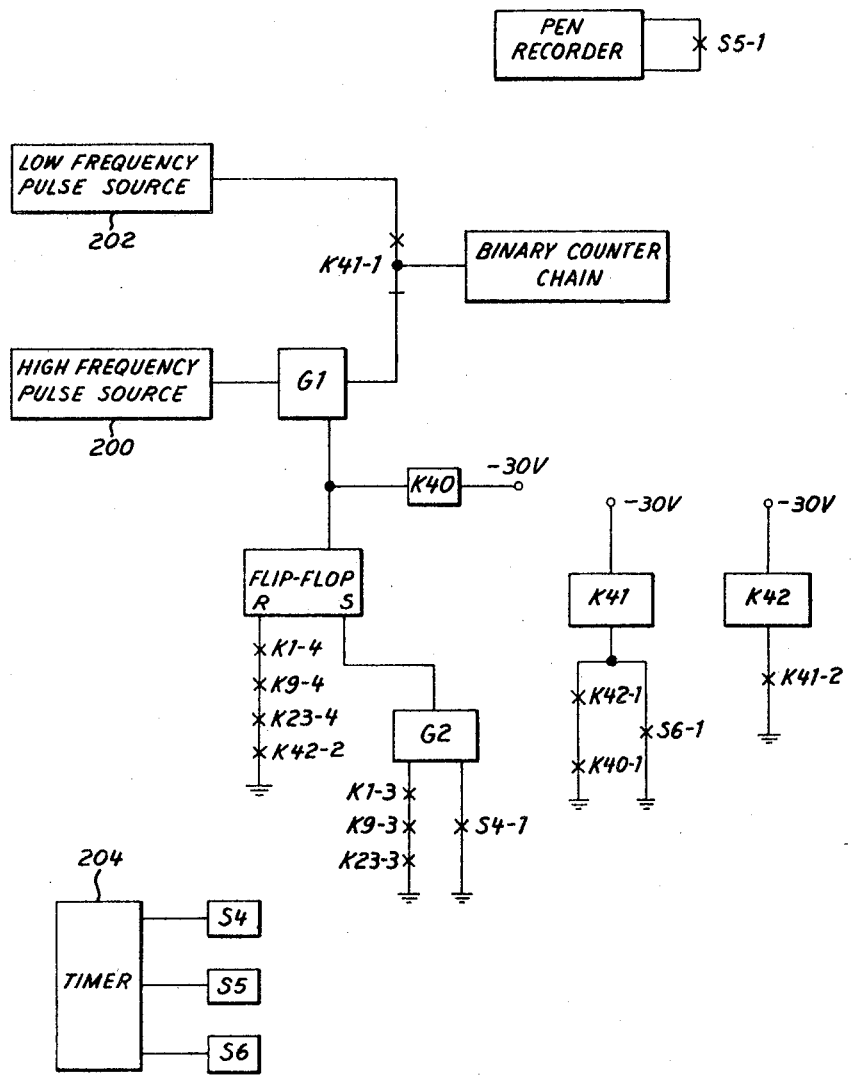
FIG. 9 shows a modification of the FIGS. 1 to 6 embodiment to permit life testing and periodic contact resistance measurement for an entire ferreed switch.

Reference is next made to FIGURE 9, which illustrates a modification to the FIGURE 1 to 6 device, to permit this device to perform life testing of an entire switch by opening and closing the crosspoints at a rapid rate, and periodically (e.g., every hour) slowing down the opening and closing rate and performing a contact resistance check on the sealed contact.

The apparatus of FIGURE 9 includes a high frequency oscillator 200 for providing timing pulses to the counter chain at a rapid repetition rate, and a lower frequency oscillator 202 for providing timing pulses at a lower repetition rate. The low frequency oscillator is for use when the contact resistance is to be recorded. Switches S4, S5, S6 are provided, operated by an automatic timer 204. Switches S4 and S6 control the shift from a lifetime test (during which each crosspoint is rapidly closed, current is injected through a contact and then removed, and the crosspoint is opened, but no record is made of the contact resistance) and a slower contact resistance test (during which the crosspoints are closed and opened more slowly so that the pen recorder 19 may record the contact resistance of the sealed contacts). Switch S5 applies power to the pen recorder 19 during the periods in which the resistance of the sealed contacts is being checked.

The operation of the testing device with the modifications shown in FIGURE 9 is as follows. Assume that the machine is carrying out the life test routine at high speed, i.e., that high frequency oscillator 200 is connected to the binary counter chain, through gate G1. During this procedure, switches S4 to S6 are all open, and no record is made of the resistance of the sealed contacts under test.

The high speed test will typically be at the rate of two passes through the 64 crosspoint array each second. In order to obtain this speed of operation, the relays shown will typically be mercury, rather than wire spring, relays. In addition, the power source 8 may typically include a silicon controlled rectifier flip-flop (controlled from the function counter) to supply the power pulses necessary to close and open the crosspoints at a rapid rate.

Assume now that the timer 204 closes switch S4, removing one inhibit from gate G2. The machine then continues stepping at high speed until (assuming that the FIG. 6 modification is being used, but without relay K21) all of the group D contacts have been tested without their resistance being measured. The address and group counters then assume a "home" condition, in which relays K1, K9, K23 are operated.

Contacts K1-3, K9-3, K23-3 then close to remove the other inhibit from gate G2. The output from gate G2 then sets a flip-flop 206. The output from flip-flop 206 inhibits gate G1 which disconnects the high frequency oscillator from the counter chain, stopping the tester in interval 1 of the testing of the group A contact of crosspoint X1. The flip-flop 206 output also operates relay K40, for a purpose that will become apparent shortly.

About ½ second after closing switch S4 (i.e., long enough to allow the tester to reach its home condition), the timer 204 closes switch S5, closing contact S5-1 to energize the pen recorder 19. In addition, switch S4 is opened, since it no longer need remain closed, flip-flop 206 already having been set.

A few seconds later, after the pen recorder has reached operating condition, the timer 204 closes switch S6, operating contact S6–1 to operate relay K41. Contacts K41–1 then connect the low frequency oscillator to the binary counter chain to carry out the low speed test, during which the resistance of each sealed contact is recorded.

In addition, when relay K41 operates, its contact K41–2 energizes a slow operate relay K42. Relay K42 does not operate until after testing of the group A contact of the first crosspoint X1 is completed. Its contact K42–1 then locks relay K40 operated, through contact K40–1 (so that switch S6 may then be released by timer 204) and its contact K42–2 prepares a path to reset flip-flop 206 after the contact resistance of all of the contacts of the switch has been recorded.

After the resistance of the group A, B, C, D contacts of the switch has been recorded and the counter chain reaches home position again, contacts K23–4, K1–4, K9–4, and K42–2 are closed to reset flip-flop 206, thus removing the inhibit from gate G1. In addition, relay K40 releases, releasing relay K41 to reconnect the high frequency oscillator to the counter chain. Contact K41–2 releases relay K42.

The timer now opens switch S5 to deactivate the pen recorder, and the testing device is back in the life test operation mode, in which the contacts are checked at high speed without recording their resistance.

I claim:
1. Apparatus for testing a ferreed switch, said switch including
 (a) a plurality of crosspoints, each crosspoint having a contact to be tested,
 (b) a plurality of $x$ and $y$ conductors, one $x$ and $y$ conductor associated with each crosspoint, simultaneous energization of a selected $x$ and $y$ conductor associated with a crosspoint closing such crosspoint, and energization of one only of selected $x$ and $y$ conductors opening such closed crosspoint, closing of a crosspoint closing its contact and opening of a crosspoint opening its contact, said apparatus comprising
 (c) a timing pulse source,
 (d) a binary counter chain including a first plurality of binary counters connected in series and forming a function counter part, and a second plurality of binary counters connected in series and forming an address counter part, said address counter part being connected to said function counter part and said function counter part being connected to said timing pulse source, for operation of said binary counter chain by timing pulses produced by said source,
 (e) energization means for energizing said $x$ and $y$ conductors,
 (f) address means addressable to couple said energization means to a selected pair of $x$ and $y$ conductors, thus to address their associated crosspoint,
 (g) first switch means operable to connect said selected pair of $x$ and $y$ conductors to said energization means to close such addressed crosspoint,
 (h) second switch means operable to connect one only of said selected pair of $x$ and $y$ conductors to said energization means to open such addressed closed crosspoint,
 (i) test current supply means for connection to said contact for passing a test current through a closed contact,
 (j) means for interrupting said test current,
 (k) logic means coupling said binary counter chain to said means (f) to (j) for said counter chain first to operate said address means to couple the $x$ and $y$ windings of a selected crosspoint to said energization means, then to operate said first switch means to close said selected crosspoint, then to operate said test current supply means to pass current through the contact of said selected crosspoint, then to operate said means (j) to remove said test current, and then to operate said second switch means to energize one only of said selected $x$ and $y$ windings to release said selected crosspoint,
 (l) measuring means for measuring the resistance of a contact while current is passing through such contact,
 (m) means for indicating when the resistance of the contact being tested exceeds a predetermined value,
 (n) said logic means including means connecting said function counter part to said first and second switch means, to said current supply means, and to said means for removing said current, for said function counter part to sequence the operations of closing an addressed crosspoint, testing its contact, and opening such crosspoint; and said logic means further including means connecting said address counter part to said address means (f) to address a new crosspoint following testing of a previous crosspoint.

2. Apparatus according to claim 1 wherein said function counter part comprises three binary counters connected in series, the first of said binary counters being connected to said timing pulse source, and the third of said binary counters being connected to said address counter part.

3. Apparatus according to claim 1 wherein said measuring means comprises a Wheatstone bridge circuit, and said means for indicating comprises a pen recorder.

4. Apparatus according to claim 1 including test means for testing each contact, following measurement of its resistance and operation of said second switch means to open its associated crosspoint, to determine whether such contact has opened, said test means comprising
 (1) a detector operative upon passage of current therethrough,
 (2) connecting means operative for connecting said detector, said current supply means, and said contact in series,
 (3) said logic means including means coupled to said function counter part of said counter chain to operate said connecting means following testing of a contact of a crosspoint and before addressing of the next crosspoint, thus to operate said detector if such contact under test has failed to open.

5. Apparatus according to claim 1 wherein each crosspoint includes two contacts, said apparatus further including
 (n) first connecting means for connecting one contact of each crosspoint together to form a first group of contacts, and second connecting means connecting the other contacts of each crosspoint together to form a second group of contacts,
 (o) and selection means for connecting one of said groups of contacts to said measuring means, for the resistance of a closed contact of said one group to be measured.

6. Apparatus according to claim 5 wherein said binary counter chain includes a group selection binary counter connected to the last binary counter of said address counter part of said counter chain, so that said group selection binary counter will change state following addressing of all of the crosspoints of said switch, and further logic means connecting said group selection binary counter to said selection means for change of state of said group selection binary counter to operate said selection means to disconnect said one group of contacts from said measuring means and to connect said other group of contacts to said measuring means.

7. Apparatus according to claim 1 and for performing a lifetime test on the contacts of said ferreed switch at a first rapid rate without measuring the resistance of the contacts of said switch, and for periodically performing a contact resistance measurement test on said contacts at a second and slower rate, said apparatus comprising (n) a further source of timing pulses, said further source supplying timing pulses at a rate faster than said first mentioned source, (o) means normally connecting said further source to said binary counter chain for rapid lifetime testing of said contacts, and including means for disconnecting said measuring means to prevent contact resistance measurement during such lifetime testing, (p) timer means for periodically disconnecting said further source from said binary counter chain at a point in a cycle of testing of said contacts at which all the contacts of said switch have been tested, and for then connecting said first mentioned source to said binary counter chain for slower testing of said contacts, said timer means including means for energizing said measuring means during such slower testing, (q) and means responsive to completion of a cycle of testing said contacts with said first mentioned source connected to said counter chain, to disconnect said first mentioned source from said counter chain and to reconnect said further source to said counter chains, to resume lifetime testing of said contacts.

8. Apparatus according to claim 7 wherein said timer means includes (1) a first inhibit gate normally coupling said further source to said binary counter chain, (2) a flip-flop having first and second conducting states, and means connecting said flip-flop to said first gate for said flip-flop in one conducting state to inhibit said first gate and in said other conducting state to allow said first gate to couple said further source to said binary counter chain, (3) a second inhibit gate connected to said flip-flop, said second gate when uninhibited switching said flip-flop to said one state, and first and second inhibit means providing first and second inhibit signals normally inhibiting said second gate, (4) first inhibit removing means connected to said first inhibit means and operative at periodic intervals to remove said first inhibit signal from said second gate, (5) second inhibit removing means connected to said second inhibit means and responsive to completion of a cycle of testing the contacts of said switch to remove the second inhibit signal from said second gate, thus allowing said second gate to switch said flip-flop to said one condition to inhibit said first gate, thus to disconnect said further source from said binary counter chain, (6) and means operative following removal of both said inhibit signals from said second gate to connect said first mentioned timing source to said binary counter chain for slower contact resistance testing of the contacts of said switch.

9. Apparatus according to claim 8 wherein said means (q) includes means responsive to completion of said cycle of testing with said first mentioned source connected to said counter chain, to uninhibit said first gate.

References Cited

UNITED STATES PATENTS

| | | | |
|---|---|---|---|
| 3,168,697 | 2/1965 | Humphrey | 324—73 |
| 3,206,729 | 9/1965 | Longcroft | 340—166 |
| 3,217,243 | 11/1965 | Franklin | 324—28 |
| 3,398,363 | 8/1968 | Mortley | 324—73 |

OTHER REFERENCES

Bell Laboratories Record, "Evaluating Sealed Contacts" (Renault et al.), May 1966, pp. 155—158.

RUDOLPH V. ROLINEC, Primary Examiner

E. L. STOLARUN, Assistant Examiner

U.S. Cl. X.R.

324—73, 62